United States Patent
Lynch et al.

[11] Patent Number: 5,839,114
[45] Date of Patent: Nov. 17, 1998

[54] AUTOMATED SYSTEM FOR SELECTING AN INITIAL COMPUTER RESERVATION SYSTEM

[75] Inventors: Michael F. Lynch, Dallas; Jonathan A. Turner, Plano, both of Tex.

[73] Assignee: Electronic Data Systems Corporation, Plano, Tex.

[21] Appl. No.: 609,040

[22] Filed: Feb. 29, 1996

[51] Int. Cl.[6] .................................................. G06F 17/30
[52] U.S. Cl. ............................................................ 705/5
[58] Field of Search ............................................ 705/5

[56] References Cited

U.S. PATENT DOCUMENTS

| | | | |
|---|---|---|---|
| 4,862,357 | 8/1989 | Ahlstrom et al. | 364/407 |
| 5,021,953 | 6/1991 | Webber et al. | 364/407 |
| 5,237,499 | 8/1993 | Garback | 364/407 |
| 5,253,166 | 10/1993 | Dettelbach et al. | 363/407 |

FOREIGN PATENT DOCUMENTS

WO 93/10502  5/1993  WIPO ............................ G06F 15/26

*Primary Examiner*—Emanuel Todd Voeltz
*Assistant Examiner*—Phillip Groutt
*Attorney, Agent, or Firm*—L. Joy Griebenow

[57] ABSTRACT

An automated system (10) is provided for selecting an initial computer reservation system. The system (10) includes a database (12) which stores data relating to each computer reservation system (30) utilized by a travel agency. The database (12) also contains one or more informational portfolios that can be used to determine the computer reservation system preferences of various parties, such as, for example, an individual traveler, a business entity employing the traveler, and the travel agency. In response to travel request information received from a customer, the system (10) automatically retrieves data/information from the database (12) and determines a target computer reservation system which most likely will be used to book travel arrangements. Consequently, the system (10) optimizes the hits-to-bookings ratio for each computer reservation system (30) utilized by the travel agency.

21 Claims, 2 Drawing Sheets

AUTOMATED SYSTEM FOR SELECTING AN INITIAL COMPUTER RESERVATION SYSTEM

TECHNICAL FIELD OF THE INVENTION

This invention relates generally to the field of travel reservation services, and more particularly, to an automated system for selecting an initial computer reservation system and method of operation.

BACKGROUND OF THE INVENTION

Typically, a customer contacts a travel agency to obtain information about travel services, such as, for example, the pricing and availability of seats on an airline flight. Because this travel information can usually be obtained through a computer reservation system (CRS), an agent at the travel agency may access a CRS in order to respond to the customer's request for information. Generally, a CRS is a proprietary travel reservation system that is not owned by the travel agency. Consequently, the travel agency must negotiate with the owner of a CRS in order to use such a system. Because the CRS owner usually earns money from the providers of travel services when the travel services are booked through its CRS, the CRS owner will require that a travel agency meet a target ratio of hits to bookings. In other words, for a predetermined number of times that the travel agency accesses (or "hits") a CRS, the travel agency must book at least a minimum number of travel arrangements through the CRS. If the travel agency does not exceed the target hits-to-bookings ratio (i.e., books at least the minimum number of travel arrangements for a predetermined number of hits), the travel agency does not have to pay the owner for using the CRS. On the other hand, if the travel agency exceeds the target hits-to-bookings ratio (i.e, books less than the minimum number of travel arrangements for the predetermined number of hits), the CRS owner usually requires that the travel agency pay money for access to the CRS. Consequently, it is undesirable for a travel agency to access multiple CRSs in order to book a single set of travel arrangements, (e.g., an airline flight), because each hit into a CRS without booking increases the hits-to-bookings ratio for that particular CRS.

SUMMARY OF THE INVENTION

Accordingly, a need has arisen for an automated system that optimizes the hits-to-bookings ratio of all CRSs utilized by a travel agency, by predicting which CRS will most likely be used to book travel arrangements in response to any given request by a customer.

In accordance with the preferred embodiment of the present invention, an automated system is provided for selecting an initial CRS. The system includes a database which stores data relating to each CRS utilized by a travel agency. The database also contains one or more informational portfolios that can be used to determine the CRS preferences of various parties, such as an individual traveler, a business entity employing the traveler, and the travel agency. In response to travel request information received from a customer, the system automatically retrieves data/information from the database and determines a target CRS which most likely will be used to book travel arrangements. Consequently, the system optimizes the hits-to-bookings ratio for each CRS utilized by the travel agency.

An important technical advantage of the present invention is that the hits-to-bookings ratio for each CRS used by a travel agency is optimized.

Another important technical advantage of the present invention is that an automated system is provided so that a travel agent does not have to manually select an initial CRS.

Yet another important technical advantage of the present invention is that an initial CRS is selected by analyzing historical travel patterns (e.g., seasonal travel patterns).

BRIEF DESCRIPTION OF THE DRAWINGS

For a better understanding of the present invention, reference may be made to the accompanying drawings, in which.

DETAILED DESCRIPTION OF THE INVENTION

Figure 1:
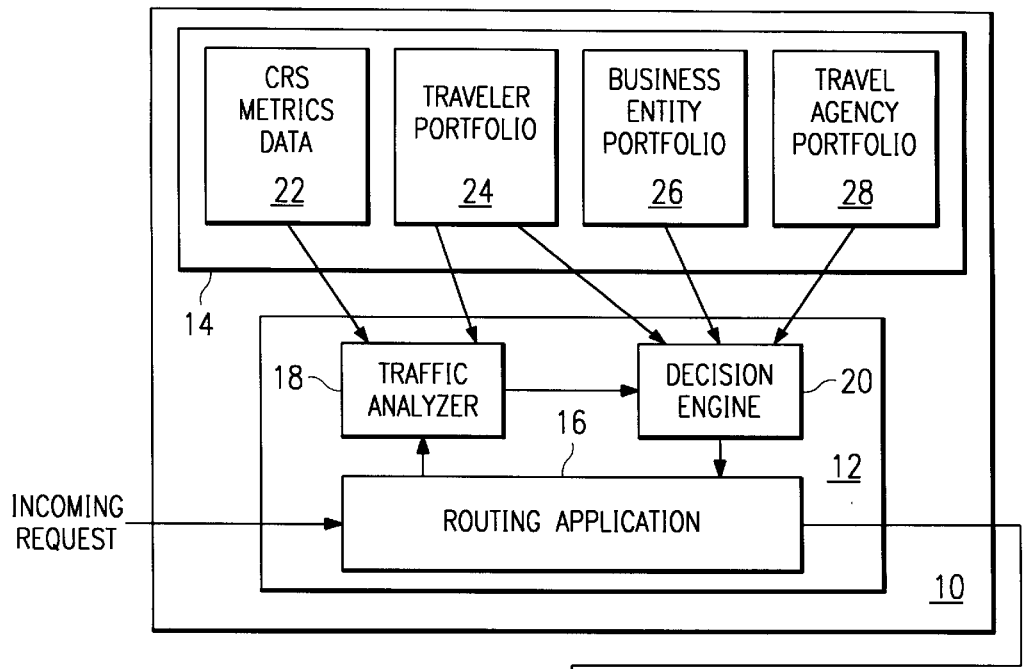
FIG. 1 is a top level block diagram of an automated system for selecting an initial CRS, in accordance with a preferred embodiment of the present invention.
Figure 2:
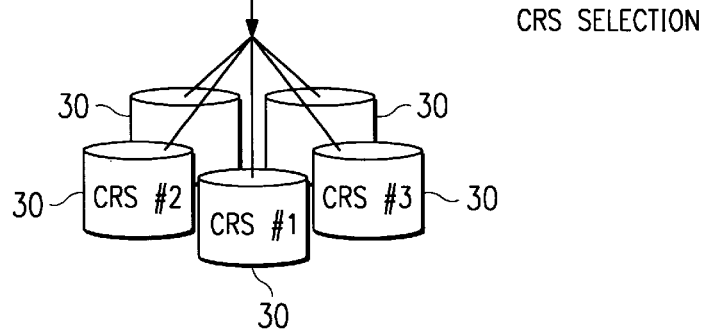
FIG. 2 is a simplified diagram of a computer-based system that can be used to implement the automated system shown in FIG. 1.
Figure 2:
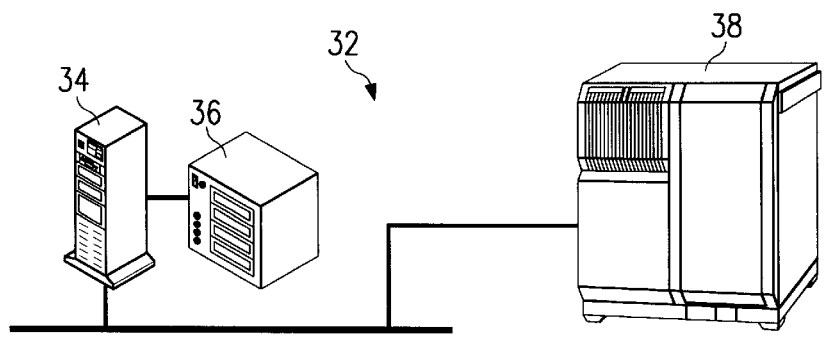
Figure 2:
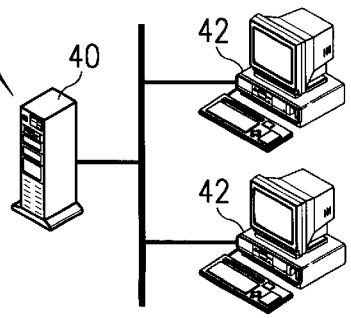
Figure 3:
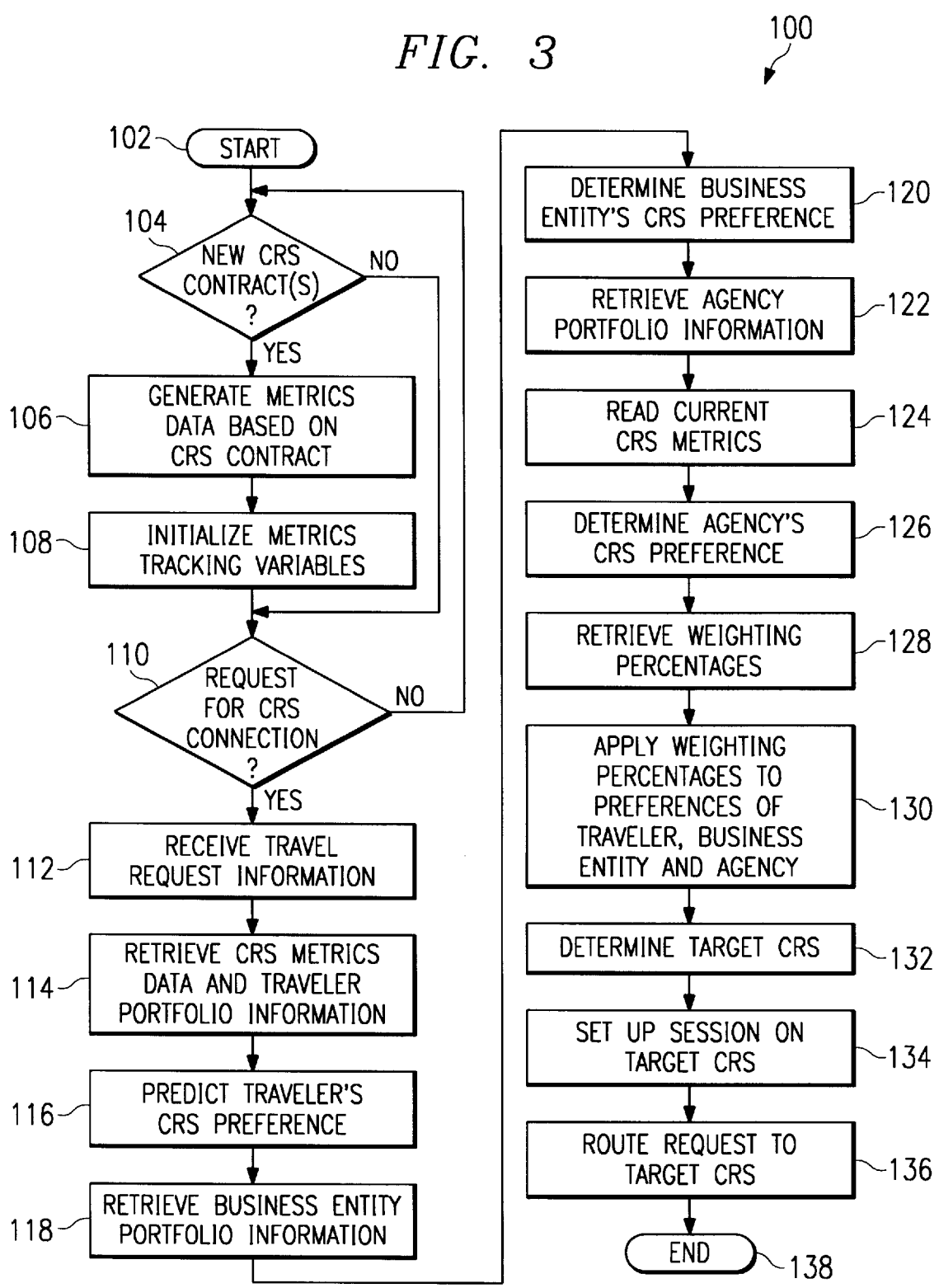
FIG. 3 is a flow diagram that illustrates a method of operating an automated system for selecting an initial CRS, in accordance with the preferred embodiment of the present invention.

The preferred embodiment of the present invention and its advantages are best understood by referring to FIGS. 1–3 of the drawings, like numerals being used for like and corresponding parts of the various drawings.

In accordance with the preferred embodiment of the present invention, an automated system is preferably used to select an initial CRS from a plurality of CRSs utilized by a travel agency. The automated system analyzes a variety of factors, such as, for example, seasonal travel patterns, that may affect whether a specific CRS would ultimately be used to book travel arrangements. Consequently, the automated system allows a travel agency to optimize its hits-to-bookings ratio for each CRS utilized by the agency.

FIG. 1 is a top level block diagram that illustrates an automated system 10 for selecting an initial CRS, in accordance with a preferred embodiment of the present invention. Referring to FIG. 1, the automated system (hereinafter, referred to as the "system") 10 is shown. System 10 is used to automatically select an initial CRS when a travel agency receives a travel request from a customer. System 10 includes a processing network 12 connected to a database 14.

Processing network 12 may consist of a single processor or, as described below with reference to FIG. 2, a plurality of interconnected processors. Processing network 12 functions to run one or more software applications or modules, which include a routing application module 16, a traffic analyzer module 18, and a decision engine module 20.

Routing application module 16 functions to identify and route all information that is input into or generated within system 10. For example, some types of information (e.g., seasonal travel patterns) are input into system 10 to be used during analysis at a later time. Routing application module 16 identifies this type of information as data which should be added to database 14, and then routes the information to the database for storage. Other types of information input into system 10 (e.g., data relating to an incoming travel request) may require immediate processing. Routing application module 16 can forward this information on to traffic analyzer module 18 and/or decision engine module 20 for processing. Furthermore, once system 10 determines an initial CRS, routing application module 16 may function to access or initiate a session on that CRS.

Traffic analyzer module 18 functions to identify the travel patterns of both specific customers and the traveling population in general by analyzing information relating to the travel history (e.g., times and dates of prior trips, destinations of prior trips, travel service providers used, etc.) of these groups. Using the identified patterns, traffic analyzer module 18 further functions to make predictions about a customer's travel request, such as, for example, the type of travel arrangement needed (e.g., airline, hotel, automobile rental, etc.), an originating and a destination city, a fare class (e.g., first class or business class), etc. In order to identify the travel patterns and make predictions, traffic analyzer module 18 is preferably implemented as a neural network. In addition, by analyzing the predictions of the neural network and the current hits-to-bookings ratio for each CRS used by the travel agency, the traffic analyzer module functions to determine a traveler's preferred CRS, preferably using fuzzy logic. The operation of traffic analyzer module 18 is described below in more detail with reference to FIG. 3.

If the customer making a travel request is employed by a particular business entity and is traveling for business-related matters, decision engine module 20 functions to determine the business entity's preferred CRS by analyzing data relating to the business entity. For example, if a corporation negotiates a bulk discount for travel on American Airlines, the corporation may prefer that airline reservations be booked on the SABRE® System (which is owned by American Airlines). Decision engine module 20 also functions to determine the travel agency's preferred CRS by analyzing data relating to each CRS used by the travel agency. For example, some CRS owners offer incentives (such as a higher hits-to-bookings target ratio) to a travel agency for booking travel arrangements on their systems. The decision engine module 20 can be further used to apply weighting values to each of the individual customer's, the business entity's, and the travel agency's CRS preferences. In addition, decision engine module 20 functions to combine the weighted CRS preferences to ultimately determine an initial CRS to be selected. Like traffic analyzer module 18, decision engine module 20 may use fuzzy logic in its analysis.

Database 14 is preferably a relational database, which resides in a data storage medium (to be described in detail below). A traveler portfolio 24 and a business entity portfolio 26 are included in the relational database in system 10, respectively, for each individual and business travel customer of the agency. In addition, the relational database contains a CRS metrics data structure 22 and a travel agency portfolio 28.

The CRS metrics data structure 22 contains information that is used to monitor and/or calculate the actual hits-to-bookings ratio for each CRS 30 utilized by the travel agency. System 10 optimizes the hits-to-bookings ratio for each CRS 30 used by a travel agency. Generally, the minimum hits-to-bookings ratio for each proprietary CRS 30 is specified in a contract negotiated between the travel agency and the owner of the CRS. This contract information is input into system 10 as part of the CRS metrics data structure 22. Additionally, each hits-to-bookings ratio is typically calculated using a bookings figure that does not include any canceled bookings. In other words, if previously booked travel arrangements are later canceled, the hits-to-bookings ratio changes. Consequently, CRS metrics data structure 22 may include, for example, the year-to-date hits, the year-to-date bookings, and the year-to-date cancellations for each CRS 30.

Traveler portfolio 24 contains, at a minimum, information that may be used to determine the CRS(s) 30 preferred by each individual customer of the travel agency. For example, because some travel services vendors which own proprietary CRSs may also sponsor frequent flyer programs, traveler portfolio 24 can contain information that identifies all of the frequent flyer programs in which an individual customer participates. In addition, traveler portfolio 24 can contain historical travel information for both specific customers and the traveling population in general. For example, the domestic and international air segments previously flown by an existing customer can be included in traveler portfolio 24. Similarly, information relating to seasonal travel of the population in general, such as, for example, an increase of travel from the northeast to Florida during the winter months, can be contained in the traveler portfolio.

Business entity portfolio 26 contains, at a minimum, information that may be used to determine the CRS(s) 30 preferred by each business entity customer of the travel agency. For example, information about the travel service vendors preferred by a corporate customer of the travel agency, airline discounts available to employees of the corporate customer, and a ranking of preferred CRSs 30 for the corporate customer can be included in business entity portfolio 26.

Travel agency portfolio 28 contains, at a minimum, information that may be used to determine the CRS(s) 30 preferred by the travel agency. For example, if the target hits-to-bookings ratio for a particular CRS is relatively high (i.e., the travel agency is allowed a large number of hits to the CRS to book a specified number of reservations), the agency may prefer to use that CRS more often. The travel agency portfolio 28 can also contain CRS metrics data, such as, for example, the target hits-to-bookings ratio for each CRS 30 used by the agency. In addition, travel agency portfolio 28 can store the weighting values which are used to weight the CRS preferences of the traveler, the business entity employing the traveler, and the travel agency. These weighting values are numerical weights (e.g., 0.73, 0.49, and 0.65) that can be assigned to each CRS preference to ultimately determine an initial CRS selection. It should be noted that system 10 can be used and maintained by one or more travel agencies, in which case, travel agency portfolio 28 contains separate information for each travel agency.

A plurality of CRSs 30, used by a travel agency, can be linked electronically with system 10. Each CRS 30 may be one or more commercially available CRSs such as, for example, the SABRE®, Apollo® owned by Galileo International Partnership, Worldspan® owned by Pars Marketing Partnership, or SYSTEM ONE® owned by Amadeus Global Travel Distribution. CRSs 30 provide travel service inventory information, such as, for example, airline flight availability and rates.

System 10 receives information relating to an incoming travel request from a customer, and in response, determines a target CRS that should be initially selected in order to further process the travel request. System 10 may also function to initiate a session with the target CRS. Because the target CRS is preferably used to ultimately book travel arrangements pursuant to the travel request, the actual hits-to-bookings ratio for each CRS 30 used by the travel agency is reduced or optimized.

FIG. 2 is a simplified diagram of an exemplary computer-based system 32 that can be used to implement system 10 shown in FIG. 1. Referring to the embodiment shown in FIG. 2, the computer-based system 32 can include a process server 34, a data storage device 36, a mainframe computer 38, a local file server 40, and at least one workstation or desktop computer 42. Process server 34 preferably functions to process travel-related data and command information. A SUN SOLARIS 2.3 system has been successfully utilized as a process server 34. Data storage device 36 can be a mass storage subsystem of tapes and/or disk drives, which is electronically coupled to process server 34. In the preferred embodiment, a relational database resides in data storage device 36. Consequently, process server 34 may retrieve, process, and store the information in the relational database residing in data storage device 36.

The mainframe computer 38 may be linked electronically to process server 34 through a local or wide area network (LAN/WAN), for automated uploading and downloading of information therebetween. Any general purpose or medium-sized computer, which includes a central processing unit (CPU) and suitable RAM, ROM, and I/O circuitry can be utilized for mainframe 38.

Local file server 40 may be linked electronically to process server 34 by the same or a different local or wide area network, or by telecommunication lines through a modem (not explicitly shown). Additionally, as shown (for illustrative purposes only) in FIG. 2, process server 34 can be linked by a "gateway" interface communications processor to local file server 40. Local file server 40 is preferably connected to a plurality of workstations or desktop computers 42. A user of system 10, such as a travel agent, may input and receive travel-and-customer related information (including target CRS information), and system information, respectively, through any of the workstations 42. Preferably, each workstation 42 is a desktop computer having at least a 486 processor or an operational equivalent. Systems programming for system 10 may be performed using a high level programming language, such as C++.

The CRS metrics data structure 22 (containing CRS metrics data) and the traveler portfolio 24, the business entity portfolio 26, and the agency portfolio 28 (each of which contains information used to determine a preferred CRS) are preferably stored in the relational database residing in data storage device 36. Process server 34, mainframe computer 38, local file server 40, and workstations 42 are preferably linked together. Consequently, each of these devices can directly access (e.g., store and retrieve) the CRS metrics data and preferred CRS information, if necessary.

Computer-based system 32 is electronically linked to the CRSs 30, preferably via a travel information analysis (TIA) subsystem (not shown). Consequently, system 10 can initiate a session with each CRS 30 to receive, store (e.g., in the relational database), process, and display (e.g., via workstations 42) all available computer reservations system information.

FIG. 3 is a flow diagram that illustrates a method 100 by which system 10 automatically selects an initial CRS 30 in response to a received travel request, in accordance with the preferred embodiment of the present invention. During the steps of method 100, a user of system 10, such as a travel agent, communicates with the system, preferably via a workstation 42. For example, an agent can input system commands and travel request information by pressing appropriate keys (typing) on a workstation keyboard, or "clicking" on an option in a WINDOWS-type display. In return, the workstation 42 can display the target CRS 30 which system 10 determines should be initially accessed in order to serve a customer.

At block 102, method 100 is initiated. More specifically, system 10 initiates routing application module 16, which identifies and/or routes all information received by the system.

At block 104, system 10, under the control of routing module 16, system 10 queries a user, such as a travel agent, whether information relating to a new CRS contract should be input into the system. If there is a new CRS contract, at block 106, system 10 generates metrics data (e.g., a target hits-to-booking ratio) based on that CRS contract by prompting the agent to input the information into the system. Routing application module 16 then routes the metrics data to CRS metrics data structure 22 or any of the portfolios of database 14 for storage. For example, the target hits-to-bookings ratio specified by a new CRS contract can be routed to the travel agency portfolio 28.

At block 108, system 10 initializes one or more metrics variables which are used to track and/or calculate the travel agency's usage of each CRS 30. These variables may include, for example, the current hits-to-bookings ratio, the year-to-date hits, the year-to-date bookings, and the year-to-date cancellations for every CRS used by the travel agency.

When a travel request from a customer is received by the agency, the travel agent again communicates with system 10 to select an initial CRS. At block 110, system 10, still under the control of routing application module 16, queries whether the communication is related to a request for connection to a CRS 30. If so, system 10 prompts the travel agent to input travel request information into the system. The travel request information may include, for example, the name of the customer, the type of travel arrangements needed (e.g., airline flight), and the dates of travel. Furthermore, if the customer is new to the travel agency and is traveling for business purposes, system 10 may prompt the agent to input additional information relating to the customer and the customer's employer, such as, for example, any frequent flyer programs in which the customer participates, any discounts available to the customer, etc.

At block 112, system 10 receives the travel request information. If new customer and/or business entity information has been input, routing application module 16 sends such information to traveler portfolio 24 and business entity portfolio 26, respectively, for storage. Routing application module 16 then forwards the remaining travel request information, and passes control of system 10, to traffic analyzer module 18.

At block 114, the traffic analyzer module 18 directs system 10 to retrieve CRS metrics data and travel portfolio information from, respectively, CRS metrics data structure 22 and traveler portfolio 24 stored in database 14. As described above, the CRS metrics data can include current hits-to-bookings ratios for each CRS 30 used by the travel agency, and the traveler portfolio information can include travel history information for both specific customers and the general population of travelers.

At block 116, under the control of traffic analyzer module 18, system 10 predicts what CRS would likely be preferred by the individual traveler using the retrieved information and the received travel request information. More specifically, traffic analyzer module 18 can be implemented as a neural network, which identifies certain patterns in the travel history information. Based upon the identified patterns and selected travel request information (e.g., the identity of a traveler, the dates of the travel, etc.), the neural network of the traffic analyzer predicts a variety of trip-related items, such as, for example, the type of travel arrangements needed (e.g., airline, hotel, automobile rental, etc.), an originating and a destination city, a fare class (e.g., first class or business class), etc. For example, during the holidays, a large number of people fly for personal (as opposed to business-related) reasons, and therefore must pay for their own airline expenses. Thus, travel history information may indicate that many travelers have selected low-cost airline flights during holiday seasons. Traffic analyzer module 18 identifies this pattern of travelers choosing inexpensive flights during the holidays, and predicts that the customer will be requesting coach class airline travel arrangements on a specific, relatively inexpensive carrier (e.g., "ABC Airlines"), which can be booked on the Apollo system. Because the historical travel information can be diverse, the neural network of traffic analyzer module 18 may output one or more predictions after identifying a plurality of travel patterns.

Traffic analyzer module 18 determines the individual traveler's preferred CRS by analyzing the neural network's prediction(s) along with the current hits-to-bookings ratio for each CRS, preferably using fuzzy logic. In fuzzy logic, decision making is modeled on the kind of imprecision found (intentionally or not) in human reasoning. The "truth" of a statement or supposition may be represented on a scale of 0 to 1. A value of 1 represents completely true, a value of 0 represents completely false, and intermediate values represent varying degrees of truth. The numerical value for a degree of truth is often referred to as a "belief value" or "degree of membership" (e.g., a degree of membership of 0.7 indicates that a supposition is believed to be 70% true). Thus, for example, traffic analyzer module 18 converts the neural network's predictions and the current hits-to-bookings ratios into fuzzy representations, such as, for example, "There is a slightly high chance that the preferred carrier will be ABC Airlines," or "The Apollo system is a CRS with a very low current hits-to-bookings ratio." The traffic analyzer module then applies a rule base to the fuzzy representations to produce a fuzzy solution, which identifies a particular CRS. For example, one rule may stipulate: "If the chance of the predicted CRS being the CRS actually used to book flight arrangements is slightly high, and if that CRS has a very low current hits-to-bookings ratio, then that CRS most likely should be selected." Because different rules may produce different fuzzy solutions, system 10 (still under the control of the traffic analyzer module 18) assigns weights to each fuzzy solution. For example, in response to the application of four different rules, system 10 may output the following weighted solutions: (1) 0.32 SABRE, (2) 0.45 SABRE, (3) 0.68 Apollo, and (4) 0.80 SABRE. The weights associated with each specific CRS are added together. Thus, SABRE has a combined weight of 1.57 (0.32 +0.45+0.80) and Apollo has a combined weight of 0.68. System 10 determines that the CRS having the highest total weight is the preferred CRS of the individual customer. Traffic analyzer module 18 then forwards both the results of its analysis and control of system 10 to decision engine module 20.

Preferably, decision engine module 20 uses fuzzy logic in a manner similar to the traffic analyzer module 18, although the fuzzy logic rules may differ slightly. At step 118, if the individual customer is employed by a business entity, system 10 under the control of decision engine module 20 retrieves business entity information from business entity portfolio 26 stored in database 14. At step 120, system 10 determines the business entity's CRS preference in response to the retrieved information and the information generated by traffic analyzer module 18. In many cases, this CRS preference will not be the same as the customer CRS preference determined by the traffic analyzer module 18.

Next, at step 122, still under the control of decision engine module 20, system 10 retrieves travel agency information from travel agency portfolio 28 in database 14. At block 124, the decision engine module 20 reads the current CRS metrics, which include the current hits-to-bookings ratios for each CRS 30 utilized by the travel agency. Based upon the retrieved agency portfolio information and the current CRS metrics data, system 10 determines the travel agency's CRS preference, which may differ from both the business entity's and the individual customer's CRS preferences. Any information received and/or generated by decision engine module 20 can be added or used to update business entity portfolio 26 and travel agency portfolio 28 in database 14.

The CRS preferences for each of the individual customer, the business entity employing the customer, and the travel agency are output as fuzzy representations. Each fuzzy representation may have a corresponding numerical value— e.g., a fuzzy representation of "slightly high" may correspond to a value of $2/3$. Thus, for example, the individual customer's CRS preference may be have a fuzzy value of $2/3$, the business entity's CRS preference may have a fuzzy value of $2/3$, and the travel agency's CRS preference may have a fuzzy value of $1/2$.

At block 128, decision engine module 20 retrieves weighting values from travel agency portfolio 28 in relational database 14. Preferably, the sum of all the weighting values is equal to one (1). The weighting values may differ from one case to another. For example, if the traveler is an entry level employee at a large corporation, the weighting value for the business entity's CRS preference can be relatively high. By contrast, in another example, if the individual customer is the president of a small company which the customer also owns, the weighting value for the individual's CRS preference will be relatively high.

At block 130, decision engine module 20 applies a respective weighting value to each of the fuzzy representations of the CRS preferences for the individual customer, the business entity employing the customer, and the agency. Thus, for example, the fuzzy representations for the individual customer's CRS preference, the business entity's CRS preference, and the travel agency's CRS preference can be weighted with weighting values of $1/6$, $1/3$, and $1/2$, respectively. Accordingly, the individual's CRS preference can have a weighted fuzzy value of $1/9$ ($1/6 \times 2/3$), the business entity's CRS preference can have a value of $2/9$ ($1/3 \times 2/3$), and the agency's CRS preference can have a value of $1/4$ ($1/2 \times 1/2$).

At block 132, still under the control of decision engine module 20, system 10 analyzes the weighted fuzzy values to determine a target CRS. The CRS preference having the highest weighted fuzzy value is determined to be the target CRS. Thus, for example, if the weighted fuzzy values for the CRS preferences of the individual customer, the business entity, and the travel agency are, respectively, $1/9$, $2/9$, and $1/4$, then the agency's CRS preference is selected because $1/4$ is greater than either $1/9$ or $2/9$. After determining a target CRS, decision engine 20 returns control of system 10 to routing application 16.

At block 134, system 10 under the control of routing application module 16 initiates a session on the target CRS. Then, at block 136, system 10 routes a travel request to the target CRS. The preferred method 100 is then terminated. Consequently, an initial CRS may be automatically selected (and a session initiated) using system 10 so that the hits-to-bookings ratio for each CRS 30 used by a travel agency is optimized.

Although the present invention and its advantages have been described in detail, it should be understood that various changes, substitutions, and alterations can be made therein without departing from the spirit and scope of the invention as defined by the appended claims.

What is claimed is:

1. An automated system for selecting an initial computer reservation system, comprising:

a database operable to store traveler portfolio information, travel agency portfolio information, and computer reservation system metrics data; and a processing network connected to said database and operable to:

receive travel request information;

access said database to retrieve traveler portfolio information and computer reservation system metrics data in response to said received travel request information; and determine a target computer reservation system.

2. The system of claim 1, wherein said database is further operable to store business entity portfolio information.

3. The system of claim 2, wherein said processor is further operable to access said database to retrieve business entity portfolio information in response to said received travel request information.

4. The system of claim 3, wherein said processor is further operable to determine a business entity's computer reservation system preference by analyzing said accessed business entity portfolio information.

5. The system of claim 1, wherein said processor includes a neural network.

6. The system of claim 5, wherein said neural network is operable to determine a traveler's computer reservation system preference by analyzing said accessed traveler portfolio information and said received travel request information.

7. The system of claim 1, wherein said processor is further operable to automatically initiate a session with said determined target computer reservation system.

8. The system of claim 1, wherein said processor processes fuzzy logic to determine a target computer reservation system.

9. The system of claim 1, wherein said processor is further operable to determine a travel agency's computer reservation system preference by analyzing said accessed travel agency portfolio information.

10. The system of claim 1, wherein said database comprises a relational database.

11. The system of claim 1, wherein said processor is further operable to access said database to retrieve travel agency portfolio information.

12. A method for automatically selecting an initial computer reservation system, comprising the steps of:

storing traveler portfolio information, travel agency portfolio information, and computer reservation system metrics data in a database;

receiving travel request information;

retrieving said stored traveler portfolio information, travel agency portfolio information, and computer reservation system metrics data from said database in response to said received travel request information; and determining a target computer reservation system.

13. The method of claim 12, further comprising the step of storing business entity portfolio information.

14. The method of claim 13, further comprising the step of retrieving said stored business entity portfolio information from said database in response to said received travel request information.

15. The method of claim 14, wherein said determining step further comprises the step of determining a business entity's computer reservation system preference by analyzing said retrieved business entity portfolio information.

16. The system of claim 12, wherein said database is further operable to store business entity portfolio information.

17. The system of claim 16, wherein said processor is further operable to access said database to retrieve business entity portfolio information in response to said received travel request information.

18. The method of claim 12, further comprising the step of automatically initiating a session with said target computer reservation system.

19. The method of claim 12, wherein said determining step further comprises the step of determining a traveler's computer reservation system preference by analyzing said retrieved traveler portfolio information and said travel request information.

20. The method of claim 12, wherein said determining step further comprises the step of determining a travel agency's computer reservation system preference by analyzing said retrieved travel agency portfolio information.

21. The method of claim 12, wherein said determining step further comprises the step of applying weighting values to a traveler's computer reservation system preference and a travel agency's computer reservation system preference.

* * * * *